United States Patent [19]

Gold

[11] Patent Number: 5,013,887
[45] Date of Patent: May 7, 1991

[54] TORCH ALIGNMENT VERIFICATION METHOD AND APPARATUS

[75] Inventor: Raymond D. Gold, Waukee, Iowa
[73] Assignee: Deere & Company, Moline, Ill.
[21] Appl. No.: 547,643
[22] Filed: Jun. 29, 1990
[51] Int. Cl.$^5$ .............................................. B23K 9/10
[52] U.S. Cl. ................................ 219/124.34; 901/42
[58] Field of Search ............. 219/124.34, 125.1, 137.2; 901/42

[56] References Cited

U.S. PATENT DOCUMENTS

| 4,439,665 | 3/1984 | Arter | 219/124.34 |
| 4,538,047 | 8/1985 | Nakano et al. | 219/124.34 |
| 4,935,598 | 6/1990 | Ward | 219/137.2 |

FOREIGN PATENT DOCUMENTS 1-24968 10/1989 Japan ........................... 219/124.34

Primary Examiner—Clifford C. Shaw

[57] ABSTRACT

A method and apparatus for checking the alignment of a torch on a robotic welder to assure that the torch is in the proper position before an automatic welding operation commences or continues. An alignment verification device which includes a plunger with a contact area of relatively small diameter is positioned at the workstation. The projecting wire tip of the robotic torch is automatically moved axially toward the plunger, and, if alignment is within the desired range, the tip will contact and depress the plunger. Upon depression of the plunger, a cam-operated limit switch is closed to send a signal to the robot that alignment is acceptable. If the torch is out of alignment for any reason, or if the welding wire is bent or otherwise misaligned, the wire will miss the contact area and the welding operation will cease so that faulty welds are prevented.

20 Claims, 2 Drawing Sheets

TORCH ALIGNMENT VERIFICATION METHOD AND APPARATUS

BACKGROUND OF THE INVENTION

1. Field of the Invention

The present invention relates generally to robotic welding, and more specifically to torch alignment verification to assure quality welds in an automated welding process.

2. Related Art

Robotic welding techniques require relatively precise location of the welding torch relative to a workpiece. Typically a welding wire is fed through a welding tube, and any misalignment of the wire tip with respect to the workpiece can result in an inferior weld. If the wire tip is offset more than a very small fraction of an inch from the desired location in the path, the resulting weld can be uneven and weak since weld leg length and/or penetration are adversely affected by the offset. There are numerous sources of torch and wire tip misalignment (including non-rigid torch mounts, multiple articulation points on the robot arm, and deflection caused by heat in the welding tube itself), and less than optimum welds caused by torch and/or tip misalignment are not uncommon.

Several approaches have been utilized to deal with the problem of misalignment, but most of these have been relatively time-consuming or expensive or have not provided an accurate indication of wire tip alignment. One method in use involves clamping the robot wrist to a fixture and then determining if the tip is at a preselected location relative to the fixture. This and similar types of clamping methods are time-consuming and can usually detect only torch position variations resulting from problems arising between the clamped area and the tip. Variations caused by a problem elsewhere in the system may go undetected. Other methods, such as touch sensing utilizing a voltage source and contacting a specific area at the workstation, do not provide an indication of tip location which is sufficiently accurate to avoid poor welds due to wire tip misalignment.

BRIEF SUMMARY OF THE INVENTION

It is therefore an object of the present invention to provide an improved torch alignment verification method and apparatus. It is another object to provide such a method and apparatus which overcome the aforementioned problems.

It is a further object of the present invention to provide a torch alignment verification method and apparatus for a robotic welding workstation which utilize simple and inexpensive construction and operation and yet which very reliably determine if torch position is acceptable for an optimum weld. It is yet a further object to provide such a method and apparatus which do not require a portion of the robot to be clamped during the position determination and wherein the determination is accomplished quickly with the robot in its free, normally operating state.

It is another object of the present invention to provide a torch alignment verification method and apparatus which can accurately detect an improperly located weld wire tip. It is a further object to provide such a method and apparatus which advantageously utilize the free movement of a robotic torch in a predetermined path before an automatic welding operation commences or continues.

A method and apparatus for checking the alignment of a torch on a robotic welder to assure that the torch is in the proper position before an automatic welding operation commences or continues include an alignment verification device having a plunger with a contact area of relatively small diameter positioned at the workstation in the path of the torch. The projecting wire tip of the torch is moved axially toward the plunger in a preselected path, and, if alignment is within the desired range, the tip will contact and depress the plunger. Upon depression of the plunger, a cam-operated limit switch is closed to send a signal to the robot that alignment is acceptable. If the torch is out of alignment for any reason, or if the welding wire is bent or otherwise misaligned, the wire will miss the contact area and the welding operation will cease so that faulty welds are prevented.

The verification device is very simple and inexpensive in construction and operation, and requires relatively little time to make a position determination. A more accurate position determination is made with the robot in its normal operating mode than if a portion of the robot is clamped or otherwise inhibited in movement. Since the wire tip is the element actually being detected, the method and apparatus is more reliable than those utilizing other parts of the torch or robot arm in the detection scheme. The range of acceptable alignment is easily set by selecting the size of the contact area on the plunger.

These and other objects, features and advantages of the present invention will become apparent to one skilled in the art upon reading the following detailed description in view of the drawings.

DETAILED DESCRIPTION OF THE DRAWINGS

Figure 1:
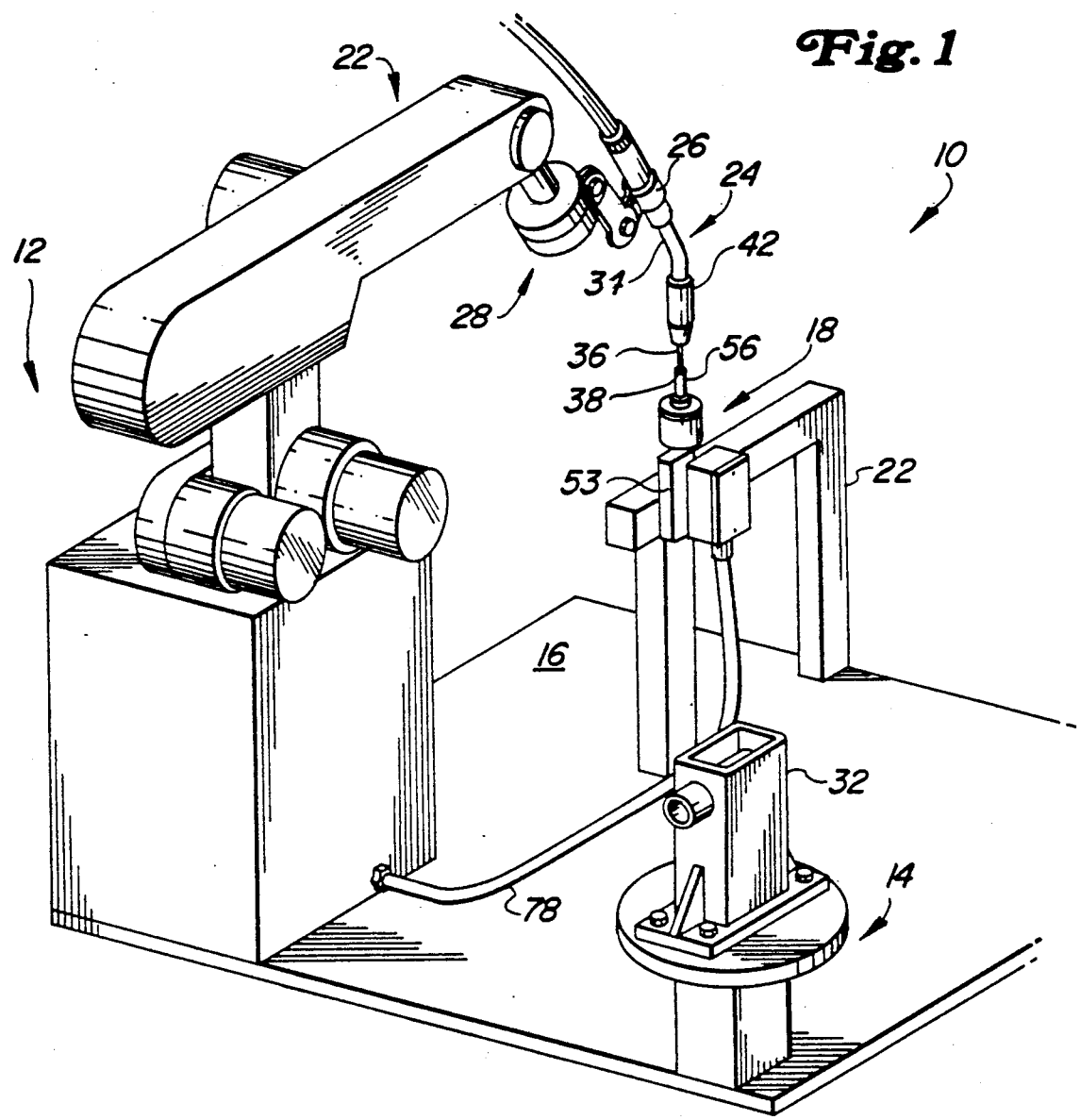
FIG. 1 is a perspective view of a robotic welding workstation including the torch verification device.

Referring now to FIG. 1, therein is shown a robotic welding workstation 10 having a robot 12 and a workpiece support 14 fixed to a stationary member 16. A torch alignment verification device 18 is fixed to the member 16 by a tubular support 20.

The robot 12 is of conventional construction and includes selectively positionable arm structure indicated generally at 22 and supporting a torch 24 on a breakaway mount. The mount 26 is connected to the arm structure 22 through wrist member 28. The robot 12 is connected to a conventional robotic controller (not shown) programmed to move the torch 24 through a precise path relative to the workpiece support 14 for automatically welding a workpiece such as shown at 32 in FIG. 1. In addition, the controller also moves the torch 24 in a path adjacent the torch alignment verification device 18 at preselected times before and/or during a weld cycle as will be discussed in detail below.

The torch 24 includes a welding tube 34 through which passes a welding wire 36 fed from a reel (not shown). The wire 36 includes a wire tip 38 projecting through a contact tip within a nozzle 42. The position of the wire tip 38 relative to the workpiece 32 is critical during welding to assure a strong, uniform weld. If the wire 36 is bent so that the tip is offset (see 38a of FIG. 2), or if the torch 24 is out of alignment, a poor weld will result.

To check for proper weld tip alignment, the torch alignment verification device 18 is supported in the programmed path of the torch 24 and is utilized to check tip position at a preselected portion of the weld cycle. If the tip position is within a preselected range of positions as determined by the device 18, the weld cycle will continue. However, if proper tip position is not sensed by the device 18 the weld cycle will be halted so that the problem can be corrected before welding is again commenced.

The torch alignment verification device 18 includes a tapered pin or plunger 50 (FIG. 2) having a shank slidably received within a vertical bore 51 in a circular block 52 fixed to the support 22 via a leg 53. A diskshaped member 54 is secured near the upper end of the pin 50 and lies in a plane perpendicular to the axis of the pin. Projecting axially upwardly from the top of the pin is contact pin 56 having a flat test area or contact area 58 which lies in a plane perpendicular to the axis of the pin 50 and preferably is circular in configuration with diameter on the order of several times the diameter of the welding wire 36. A protective inverted cup-shaped cover 62 with a central aperture is received over the pin 50 directly below the disk-shaped member 54.

Figure 2:
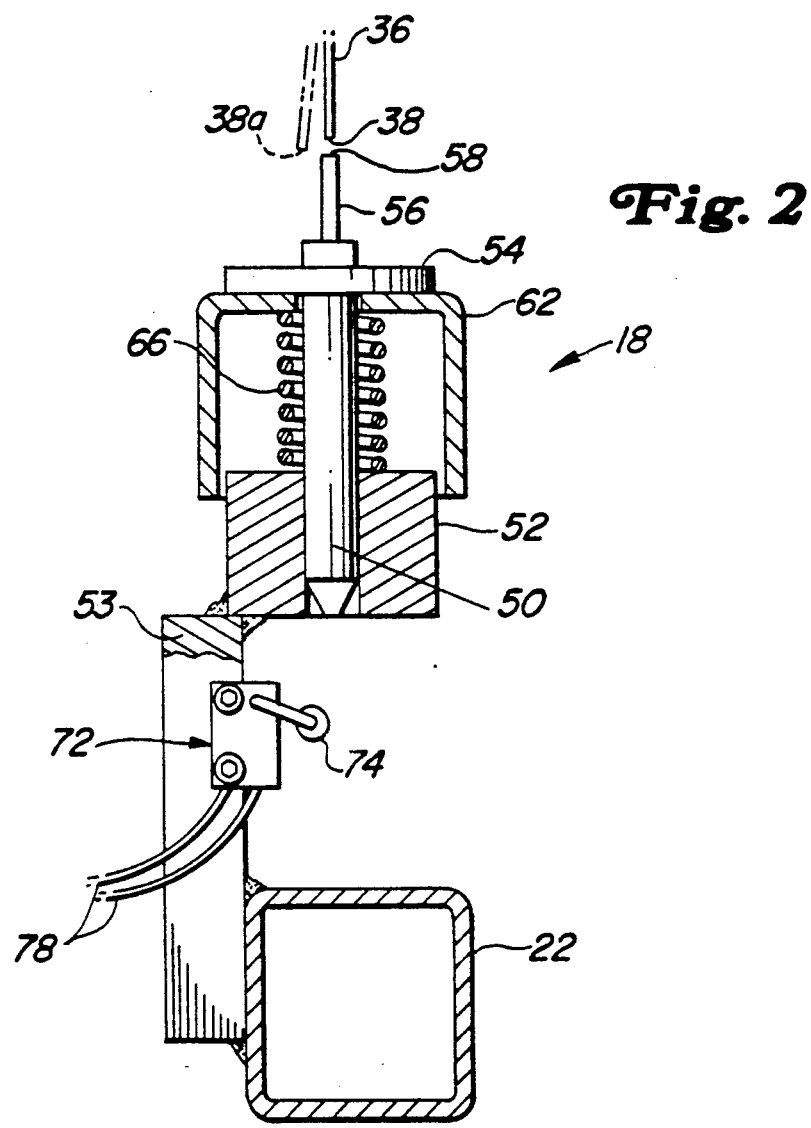
FIG. 2 is a enlarged side view, partially in section, of the torch verification device shown in FIG. 1.

The device 18 also includes a coil spring 66 encircling the pin 50 between the cover 62 and the top of the block 52 to support the pin in a normal upwardly directed position as shown in FIG. 2 wherein the lower, tapered end is generally aligned with the bottom of the block 52. A limit switch 72 is fixed to the leg 53 below the pin 50 and includes a roller-type of actuator 74 aligned with the tapered portion so that when the pin 50 is urged downwardly against the bias of the spring 66, the limit switch is actuated to provide an alignment verification signal to the robot 12 via lines 78.

During one portion of the weld cycle, preferably before a weld commences or periodically during the welding operation, the robot 12 moves the torch to a position directly over verification device 18 (FIG. 1) such that the end of the wire 36 is in axial alignment with the contact pin 54 (provided, however, that the wire is not bent as shown at 38a in FIG. 2 or the torch 24 is not out of position for any reason). The robot 12 then moves the torch 24 downwardly in the direction parallel to the axis of the contact pin 54 such that the wire tip 38 contacts the test area 58 on the top of the pin 56 to force the tapered pin 50 downwardly against the bias of the spring 66. The pin 50 moves from the position shown in FIG. 2 to a depressed position wherein the actuator 74 is contacted by the tapered end to close the limit switch 72 and thereby provide the alignment verification signal to the robot 12. After the robot receives the verification signal indicating proper welding wire tip positioning, the weld cycle is continued and the pin 50 is returned by the spring 66 to the position shown in FIG. 2.

If for any reason the wire tip 38 is not properly positioned as, for example, would happen if the wire were bent (see 38a of FIG. 2) or the torch were out of alignment, the tip 38 would miss the relatively small contact area 58 on the pin 56 as the torch is moved downwardly in the direction of the axis of the pin 50. Preferably, the contact pin and test area 58 are circular in configuration and have diameters on the order of 0.13 inch. The circular configuration of the test area 58, which is centered at the ideal wire tip location and lies in a plane perpendicular to the torch path, assures that a uniform range of misalignments will be reliably detectible. The sensitivity of the verification device 18 may be modified easily by changing the size of the test are 56, preferably by replacing the contact pin 58 with another pin of a different diameter. In operations where weld location is not as critical, the diameter can be increased to increase the range of permissible tip deviation. The diameter can be decreased to reduce the permissible range of deviation in applications where a very precise weld location is critical.

Having described the preferred embodiment, it will become apparent that various modifications can be made without departing from the scope of the invention as defined in the accompanying claims.

We claim:

1. In a robotic welder having a torch with a wire tip for welding a workpiece at a workstation, a device for checking the alignment of the torch comprising:
   a contact area;
   means yieldingly supporting the contact area at the workstation in a preselected location in the path of the torch for contact by the wire tip, when the tip is properly aligned, as the torch moves along the path;
   means for moving the torch toward the contact area; and
   means for providing an alignment signal indicative of the torch being in the proper position for welding at the workstation when the wire tip contacts the contact area and moves the contact area from the preselected location.

2. The invention as set forth in claim 1 wherein the contact area is round and lies in a plane perpendicular to the path of the torch as the torch approaches the area.

3. The invention as set forth in claim 2 wherein the radius of the area is less than approximately one-tenth of an inch.

4. In a robotic welder having a torch with a wire tip for welding a workpiece at a workstation, a device for checking the alignment of the torch comprising:
   a contact area supported at the workstation in a preselected location in the path of the torch and adapted for contact by the wire tip, when the tip is properly aligned, as the torch moves along the path;
   means for moving the torch toward the contact area;
   means for providing an alignment signal indicative of the torch being in the proper position for welding at the workstation when the wire tip contacts the contact area; and
   a plunger movably supported at the workstation and biased toward a first position, and wherein contact area is supported by the plunger such that the plunger is moved against the bias when the wire tip contacts the contact area.

5. The invention as set forth in claim 4 wherein the means for providing an alignment signal comprises a switch operable by the plunger.

6. The invention as set forth in claim 5 wherein the plunger includes a tapered surface and the switch includes an operator contacted by the tapered surface.

7. In a robotic welder having a torch with a wire tip for welding a workpiece at a workstation, a method for checking the alignment of the torch comprising:
   supporting a moveable contact area of given size at the workstation and biasing the contact area to a preselected location in the path of the torch, the contact area adapted for contact by the wire tip, when the tip is properly aligned;

moving the torch in a predetermined path toward the contact area; and providing an alignment signal indicative of the torch being in the proper position for welding at the workstation if the wire tip contacts the contact area and moves the contact area against the bias as the torch moves in the predetermined path.

8. The invention as set forth in claim 7 including the step of providing a round contact area which lies in a plane perpendicular to the path of the torch as the torch approaches the area.

9. The invention as set forth in claim 8 wherein the step of providing a round contact area includes providing the radius of the area to be less than approximately one-tenth of an inch.

10. The invention as set forth in claim 7 including the step of changing the range of wire tip deviations that are detectible by varying the given size of the contact area.

11. In a robotic welder having a torch with a wire tip for welding a workpiece at a workstation, a method for checking the alignment of the torch comprising:

supporting a contact area of given size at the workstation in a preselected location in the path of the torch, the contact area adapted for contact by the wire tip, when the tip is properly aligned, wherein the step of supporting a contact area includes supporting a movable pin from the workstation and biasing the pin toward a first position, moving the torch in a predetermined path toward the contact area; and providing an alignment signal indicative of the torch being in the proper position for welding at the workstation if the wire tip contacts the contact area as the torch moves in the predetermined path and moves the pin against the bias.

12. The invention as set forth in claim 11 wherein the step of providing an alignment signal comprises operating a switch with the moving pin.

13. The invention as set forth in claim 11 wherein the step of supporting a movable pin includes supporting the pin for movement along an axis; and moving the torch parallel to the axis as the torch approaches the contact area.

14. The invention as set forth in claim 13 including supporting the contact area in a plane perpendicular to the path of the torch.

15. In a robotic welder having a torch with a wire tip for welding a workpiece at a workstation, a device for checking the alignment of the torch comprising:

an axially movable plunger having a generally flat contact area supported at the workstation in a preselected location in the path of the torch with the axis of the plunger generally parallel to the torch path as the torch moves toward the contact area;

means for yieldingly biasing the plunger to a first non-contacted position and facilitating axial movement of the plunger from the first position toward a second contacted position when the torch is moved with the wire tip contacting the contact area; and means for providing an alignment signal indicative of the torch being in the proper position for welding at the workstation when the plunger moves to the second position.

16. The invention as set forth in claim 15 wherein the contact area has a cross-sectional area several times larger than the cross-sectional area of the wire tip.

17. The invention as set forth in claim 15 wherein the contact area is circular in configuration.

18. The invention as set forth in claim 15 wherein the contact area is planar and perpendicular to the axis of the plunger.

19. The invention as set forth in claim 15 including means for selectively varying the area of the contact area to provide an adjustable range of wire tip deviations wherein the alignment signal will be provided.

20. The invention as set forth in claim 17 wherein the contact area has a diameter on the order of 0.13 inches.

* * * * *